No. 784,464. Patented March 7, 1905.

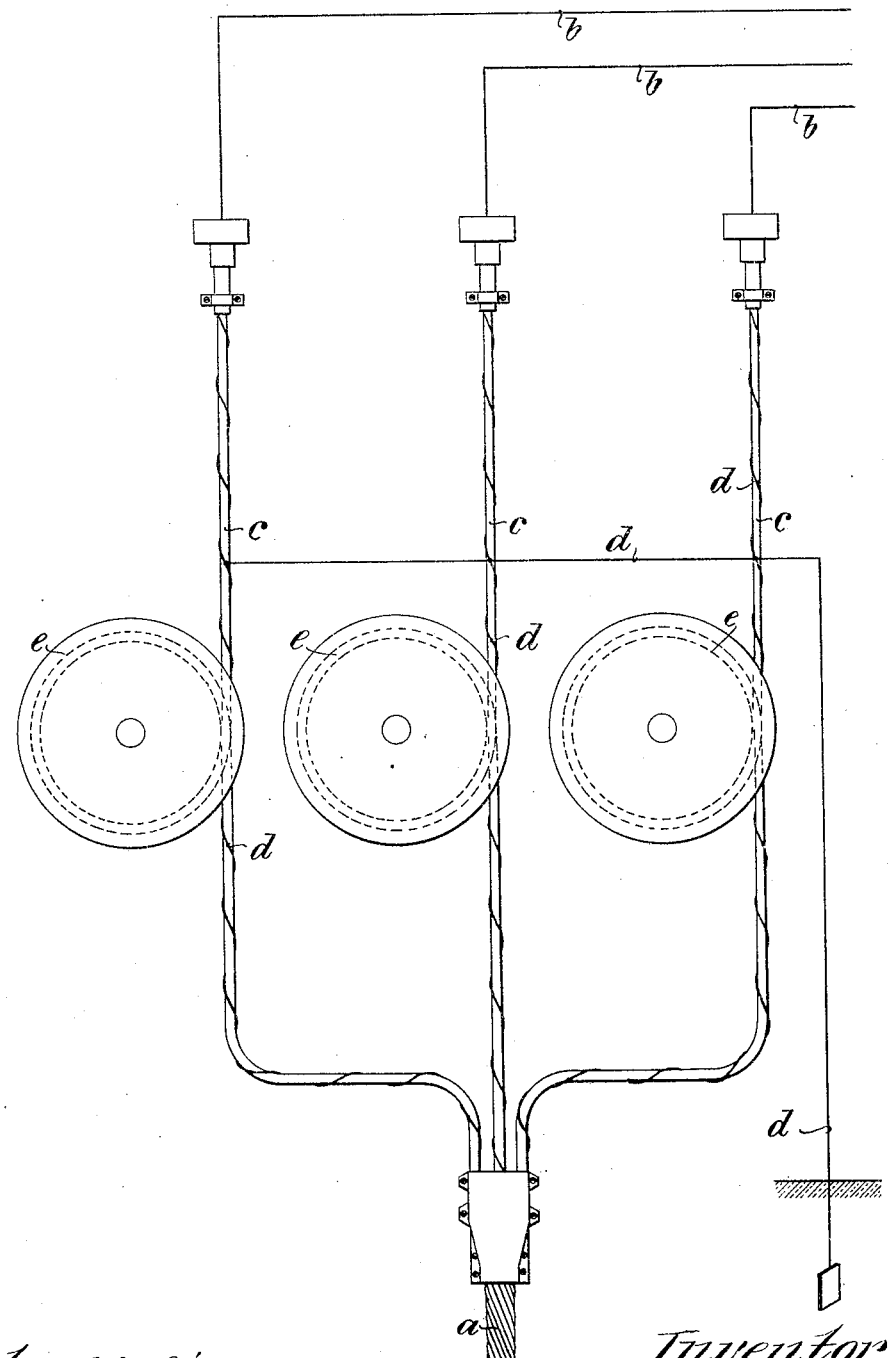

UNITED STATES PATENT OFFICE.

GEORG ZAPF, OF COLOGNE-NIPPES, GERMANY.

MEANS FOR PROTECTING ELECTRIC CABLES AGAINST EXCESS PRESSURE.

SPECIFICATION forming part of Letters Patent No. 784,464, dated March 7, 1905.

Application filed March 24, 1904. Serial No. 199,838.

*To all whom it may concern:*

Be it known that I, GEORG ZAPF, director, a subject of the King of Prussia, Emperor of Germany, residing at 72 Niehlerstrasse, Cologne-Nippes, Kingdom of Prussia, Empire of Germany, have invented certain new and useful Improvements in Means for Protecting Electric Cables Against Excess Pressures, of which the following is a specification.

Electric cables, more particularly the cable systems of large electric lighting and power installations, are not only protected against mechanical but also against electrical damage. This latter is caused by excess pressure, which may be produced by internal electric action in the circuit or by lightning. In order to render these excess pressures non-deleterious, safety devices—such as spark-gaps, choking-coils, and the like—have been hitherto employed; but these do not afford a perfectly sure protection.

Now this invention relates to an arrangement by means of which the protection is further increased in the following manner: A piece of cable $c$ is introduced between the main cable $a$ and the wires $b$, branching off from the same, which latter lead to the current-producers or the places of consumption. Three such branches $b$ are assumed to be employed in the arrangement shown in the accompanying drawings. The inserted pieces of cable $c$ are less insulated than the main cable, and their lead casings are well earthed on account of the fusibility and poor conducting properties of the casings by their being wrapped with a copper wire $d$, leading to the earth. One intermediate cable $c$, common to all the branch conductors, may be provided; but it is preferable, as shown in the drawings, to connect each separate free conductor with the main cable by a separate intermediate cable $c$. The action of this arrangement is that when excess pressures arise they must first and under all circumstances penetrate through the protective cable before they can damage the main cable. This protective cable $c$ is wound up into a coil $e$, by which also a self-induction in the protective cable is obtained. The windings of the lead casing are insulated from one another in order that the electromotive force induced in them may not lead to the formation of an induction-current in the lead casing. The action of this arrangement is that when excess pressures arise they must first and under all circumstances penetrate through the windings of the coil before they can damage the main cable.

I declare that what I claim is—

A coil for protecting an electrical cable against excess pressures, comprising a weakly-insulated cable introduced into the circuit of the cable to be protected and provided with a lead casing and an earthed conductor formed of a wire wrapped around said casing substantially as and for the purpose set forth.

In testimony whereof I have hereunto set my hand in presence of two subscribing witnesses.

GEORG ZAPF.

Witnesses:
 WILHELM KNEPPERS,
 GUSTAV ELSNER.